United States Patent
Griffin et al.

(10) Patent No.: US 12,039,411 B2
(45) Date of Patent: Jul. 16, 2024

(54) PERFORMING ERROR CORRECTION OPTIMIZATION FOR QUANTUM SERVICES USING QUANTUM SIMULATORS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 145 days.

(21) Appl. No.: 17/733,058

(22) Filed: Apr. 29, 2022

(65) Prior Publication Data

US 2023/0351240 A1 Nov. 2, 2023

(51) Int. Cl.
  G06N 10/70 (2022.01)
  G06N 10/20 (2022.01)
  G06N 10/80 (2022.01)

(52) U.S. Cl.
  CPC .......... G06N 10/70 (2022.01); G06N 10/20 (2022.01); G06N 10/80 (2022.01)

(58) Field of Classification Search
  CPC ......... G06N 10/70; G06N 10/20; G06N 10/80
  USPC .................................................. 714/774, 799
  See application file for complete search history.

(56) References Cited

U.S. PATENT DOCUMENTS

| 10,922,166 | B2 * | 2/2021 | Hogaboam | G06N 10/00 |
| 10,984,152 | B2 | 4/2021 | Rubin | |
| 2020/0285539 | A1 * | 9/2020 | Fowler | G06F 11/1076 |
| 2021/0056003 | A1 | 2/2021 | Stevanovic | |
| 2021/0240893 | A1 * | 8/2021 | Gunnels | G06F 30/30 |
| 2021/0294680 | A1 | 9/2021 | Da Silva | |
| 2021/0374597 | A1 | 12/2021 | Kelly | |
| 2021/0391873 | A1 * | 12/2021 | Zheng | G06N 3/045 |
| 2021/0399743 | A1 * | 12/2021 | Zheng | G06N 3/045 |

(Continued)

FOREIGN PATENT DOCUMENTS

CN 112988451 A 6/2021

OTHER PUBLICATIONS

Moll, N. et al., "Quantum optimization using variational algorithms on near-term quantum devices," Quantum Science and Technology, vol. 3, Jun. 2018, IOP Publishing Ltd., 18 pages.

(Continued)

Primary Examiner — John J Tabone, Jr.
(74) Attorney, Agent, or Firm — Dority & Manning, P.A.

(57) ABSTRACT

Performing Just-In-Time (JIT) error correction optimization for quantum services using quantum simulators is disclosed herein. In one example, a processor device of a classical computing device receives an error correction optimization request from a quantum computing device, the error correction optimization request comprising one or more instructions of a service definition file of the quantum service including a location of an error, and also comprising a corrective action. Upon receiving the error correction optimization request, the processor device instantiates a plurality of quantum simulator instances associated with corresponding plurality of error correction profiles. The processor device then initiates execution of the one or more instructions in each of the plurality of quantum simulator instances to generate a corresponding plurality of execution results. The processor device uses a result evaluation criterion to identify an optimal execution result, and then transmits the optimal execution result to the quantum computing device.

20 Claims, 8 Drawing Sheets

(56) References Cited

U.S. PATENT DOCUMENTS

| | | | | |
|---|---|---|---|---|
| 2022/0382605 A1* | 12/2022 | Griffin | .................. | G06F 9/5044 |
| 2023/0168956 A1* | 6/2023 | Griffin | .................. | G06N 10/70 |
| | | | | 714/47.3 |
| 2023/0169387 A1* | 6/2023 | Coady | .................. | G06N 10/70 |
| | | | | 714/746 |
| 2023/0229491 A1* | 7/2023 | Coady | ................ | G06F 11/0793 |
| | | | | 718/102 |
| 2023/0237364 A1* | 7/2023 | Coady | .................. | G06N 10/80 |
| | | | | 714/704 |
| 2023/0274178 A1* | 8/2023 | Griffin | ................ | G06F 11/3636 |
| | | | | 706/62 |
| 2023/0281501 A1* | 9/2023 | Griffin | ................ | G06F 11/3664 |
| | | | | 706/62 |
| 2023/0289648 A1* | 9/2023 | Griffin | .................. | G06N 10/80 |
| | | | | 703/21 |
| 2023/0325703 A1* | 10/2023 | Coady | .................. | G06N 10/60 |
| | | | | 706/62 |
| 2023/0351240 A1* | 11/2023 | Griffin | .................. | G06N 10/80 |

OTHER PUBLICATIONS

Ryan-Anderson, C. et al., "Realization of Real-Time Fault-Tolerant Quantum Error Correction," Physical Review X 11, 041058, Dec. 2021, American Physical Society, 29 pages.

* cited by examiner

PERFORMING ERROR CORRECTION OPTIMIZATION FOR QUANTUM SERVICES USING QUANTUM SIMULATORS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because of the inherent instability of qubits, quantum computing devices employ quantum error correction (QEC) mechanisms to detect and remedy quantum errors that may occur while executing quantum services. As quantum computing continues to increase in popularity and become more commonplace, an ability to efficiently optimize corrective actions in response to quantum errors will be desirable.

SUMMARY

The examples disclosed herein perform Just-In-Time (JIT) error correction optimization for quantum services using quantum simulators. In one example, an error correction optimization service provides a mechanism for employing multiple quantum simulator instances to identify an optimal execution result for instructions of a service definition file that previously generated an error.

In another example, a method for performing JIT error correction optimization for quantum services using quantum simulators is disclosed. The method comprises receiving, by a classical computing device from a quantum computing device, an error correction optimization request comprising one or more instructions of a service definition file of a quantum service, the one or more instructions including a location of an error, and a corrective action. The method further comprises instantiating, by the classical computing device, a plurality of quantum simulator instances, each corresponding to one of a plurality of error correction profiles. The method also comprises initiating execution, by the classical computing device, of the one or more instructions of the service definition file and the corrective action in each of the plurality of quantum simulator instances to generate a corresponding plurality of execution results. The method additionally comprises identifying, by the classical computing device based on a result evaluation criterion, an optimal execution result among the plurality of execution results. The method further comprises transmitting, by the classical computing device, the optimal execution result to the quantum computing device.

In another example, a computing system for performing JIT error correction optimization for quantum services using quantum simulators is disclosed. The computing system comprises a classical computing device that comprises a first system memory and a first processor device communicatively coupled to the first system memory. The first processor device is to receive, from a quantum computing device, an error correction optimization request comprising one or more instructions of a service definition file of a quantum service, the one or more instructions including a location of an error, and a corrective action. The first processor device is further to instantiate a plurality of quantum simulator instances, each corresponding to one of a plurality of error correction profiles. The first processor device is also to initiate execution of the one or more instructions of the service definition file and the corrective action in each of the plurality of quantum simulator instances to generate a corresponding plurality of execution results. The first processor device is additionally to identify, based on a result evaluation criterion, an optimal execution result among the plurality of execution results. The first processor device is further to transmit the optimal execution result to the quantum computing device.

In another example, a non-transitory computer-readable medium is disclosed. The non-transitory computer-readable medium stores thereon computer-executable instructions that, when executed, cause one or more processor devices to receive, from a quantum computing device, an error correction optimization request comprising one or more instructions of a service definition file of a quantum service, the one or more instructions including a location of an error and a corrective action. The computer-executable instructions further cause the one or more processor devices to instantiate a plurality of quantum simulator instances, each corresponding to one of a plurality of error correction profiles. The computer-executable instructions also cause the one or more processor devices to initiate execution of the one or more instructions of the service definition file and the corrective action in each of the plurality of quantum simulator instances to generate a corresponding plurality of execution results. The computer-executable instructions additionally cause the one or more processor devices to identify, based on a result evaluation criterion, an optimal execution result among the plurality of execution results. The computer-executable instructions further cause the one or more processor devices to transmit the optimal execution result to the quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first processor device" and "second processor device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. Qubits may be employed by quantum services that are executed by quantum computing devices. While qubits can be used to perform operations that would be impractical or impossible to perform with classical bits, qubits also suffer from inherent instabilities that may be caused by factors such as susceptibility to interference from their operating environments, faulty preparation, faulty gates, and the like. These instabilities may manifest as quantum errors, such as incorrect data values and/or quantum states, that affect the qubits.

For this reason, conventional quantum computing devices employ quantum error correction services to detect and remedy quantum errors that may occur while executing quantum services. Such quantum error correction services make use of a large number of additional qubits (relative to the number of qubits required to perform a quantum operation) to detect quantum errors that may occur, and to identify and perform corrective actions to remedy or mitigate the quantum errors. Consequently, long-running quantum services that generate frequent quantum errors may incur increased performance penalties due to the consumption of quantum resources by quantum error correction services. Moreover, conventional quantum error correction services do not provide any functionality for ensuring that a corrective action identified in response to an occurrence of an error is necessarily optimized for the environment in which the error occurred or may occur in the future.

In this regard, examples disclosed herein implement an error correction optimization service for performing Just-In-Time (JIT) error correction optimization for quantum services using quantum simulators. As used herein, the phrase "JIT error correction optimization" refers to the error correction optimization service's functionality for performing real-time testing of instructions identified by a quantum error correction service under different operating conditions to generate an optimal execution result in response to an error occurrence. In exemplary operation, an error correction optimization service executing on a classical computing device receives an error correction optimization request from a quantum computing device, in response to an occurrence of an error during execution of a quantum service using a service definition file (e.g., a Quantum Assembly (QASM) file, as a non-limiting example). The error correction optimization request in some examples is generated and transmitted by a corresponding error correction optimization service that executes on the quantum computing device.

The error correction optimization request comprises one or more instructions of the service definition file that include a location of the error within the service definition file, and further comprises a corrective action. The corrective action indicates a remedial action identified in conventional fashion by a quantum error correction service of the quantum computing device to correct the error, and also may also indicate a result of performing the remedial action. The remedial action may include, e.g., reallocation of qubits, recalculation of data values, and/or resetting quantum states of qubits, as non-limiting examples.

In response to receiving the error correction optimization request, the error correction optimization service executing on the classical computing device instantiates a plurality of quantum simulator instances (e.g., instances of the Qiskit quantum simulation framework, as a non-limiting example) executing in parallel. Each of the quantum simulator instances simulates quantum computing environments having different characteristics (e.g., different availability of quantum resources such as qubits, different operating environments, and/or different tolerances for error, as non-limiting examples). The quantum simulator instances therefore are associated with corresponding error correction profiles that specify one or more characteristics of the quantum computing environment simulated by the respective quantum simulator instances. The error correction profiles in some examples may specify a number of available qubits, an indication of an operating environment characteristic (e.g., temperature, processor load, memory availability, noise level, and/or the like, as non-limiting errors), and/or an indication of an error sensitivity threshold. The error correction optimization service executing on the classical computing device then initiates execution of the one or more instructions of the service definition file and the corrective action in each of the plurality of quantum simulator instances, which generate a corresponding plurality of execution results.

The error correction optimization service of the classical computing device next applies a result evaluation criterion (e.g., an execution time criterion, a resource usage criterion, an accuracy criterion, a reliability criterion, a precision criterion, and/or a reproducibility criterion, as non-limiting examples) to identify an optimal execution result among the plurality of execution results. In some examples, the error correction optimization service may identify the optimal execution result among the plurality of execution results by comparing each of the plurality of execution results with a result indicated by the corrective action using the result evaluation criterion. According to some examples, the error correction optimization service may identify the optimal execution result among the plurality of execution results by comparing each of the plurality of execution results with a desired result indicated by the one or more instructions of the service definition file using the result evaluation criterion. The error correction optimization service of the classical computing device then transmits the optimal execution result to the error correction optimization service executing on the quantum computing device.

In some examples, the error correction optimization service of the quantum computing device may detect a subsequent execution of the quantum service, and further may detect that a last instruction of the one or more instructions preceding the location of the error in the service definition file has executed. In response, the error correction optimization service of the quantum computing device implements of the optimal execution result (e.g., by requesting that the quantum computing device directly manipulate data values or quantum states of qubits used by the quantum service to produce in the optimal execution result, instead of executing the instruction that previously caused the error).

According to some examples, the optimal execution result may be implemented by the error correction optimization service of the quantum computing device generating a revised service definition file that is based on the service definition file and that incorporates the optimal execution result. The error correction optimization service configures the quantum computing device to instantiate subsequent instances of the quantum service using the revised service definition file. The error correction optimization service of the quantum computing device in some examples may also detect that all executing instances of the quantum service on the quantum computing device have completed execution, and may then initiate termination of the quantum service. In some examples, the optimal execution result may be implemented by the error correction optimization service of the quantum computing device modifying the service definition file itself to incorporate the optimal execution result while instances of the quantum service are executing.

Figure 1:
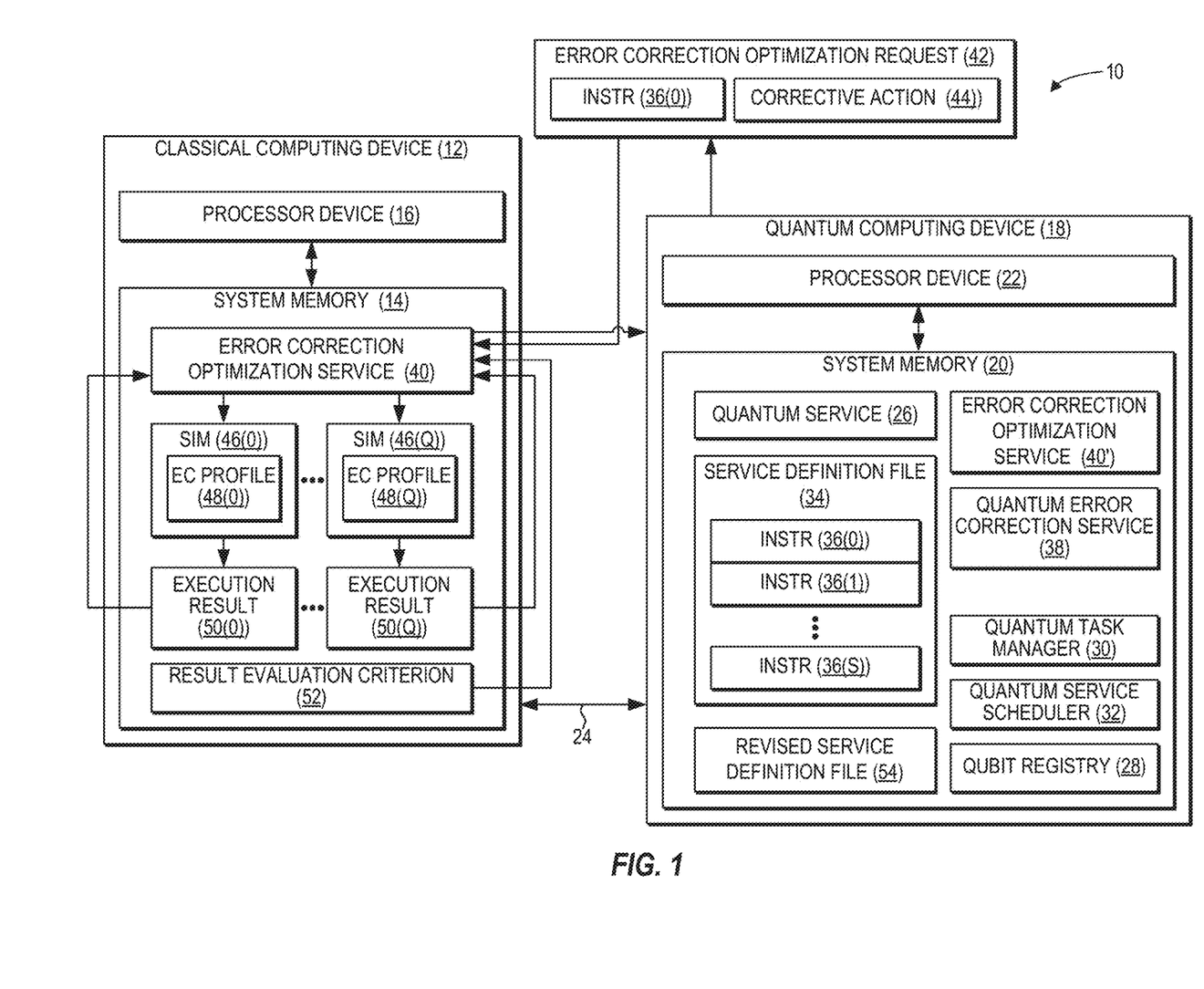
FIG. 1 is a block diagram of a computing system in which examples may be practiced.

FIG. 1 is a block diagram of a computing system 10 according to one example. The computing system 10 includes a classical computing device 12 that comprises a system memory 14 and a processor device 16, and further includes a quantum computing device 18 that comprises a system memory 20 and a processor device 22. The classical computing device 12 and the quantum computing device 18 of FIG. 1 are communicatively coupled via a classical communications link 24, which may comprise a private network or a public network such as the internet. The quantum computing device 18 may also be communicatively coupled to other quantum computing devices (not shown) via a quantum channel (not shown) over which qubits may be transmitted. It is to be understood that the computing system 10, according to some examples, may include more or fewer quantum computing devices and/or classical computing devices than illustrated in FIG. 1. Additionally, the classical computing device 12 and/or the quantum computing device 18 in some examples may include constituent elements in addition to those illustrated in FIG. 1.

The quantum computing device 18 in the example of FIG. 1 operates in quantum environments but is capable of operating using classical computing principles or quantum computing principles. When using quantum computing principles, the quantum computing device 18 performs computations that utilize quantum-mechanical phenomena, such as superposition and/or entanglement states. The quantum computing device 18 may operate under certain environmental conditions, such as at or near zero degrees (0°) Kelvin. When using classical computing principles, the quantum computing device 18 utilizes binary digits that have a value of either zero (0) or one (1).

In the example of FIG. 1, the quantum computing device 18 executes a quantum service 26, which comprises a process that employs one or more qubits (not shown) to perform quantum operations. To maintain information for qubits, the quantum computing device 18 may include a qubit registry 28, which comprises a plurality of qubit registry entries (not shown) that each correspond to a qubit. The qubit registry 28 maintains and provides access to data relating to the qubits implemented by the quantum computing device 18, including a count of the total number of qubits implemented by the quantum computing device 18 and a count of the number of available qubits that are currently available for allocation, as non-limiting examples. Each of the qubit registry entries of the qubit registry 28 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 26 is facilitated by a quantum task manager 30 and a quantum service scheduler 32, each of which operates in a manner analogous to their conventional classical counterparts. Thus, the quantum task manager 30 of the quantum computing device 18 handles operations for creating, monitoring, and terminating quantum services, while the quantum service scheduler 32 of the quantum computing device 18 controls the scheduling of quantum services for execution by the processor device 22 and the allocation of processing resources to executing quantum services. The functionality of the qubit registry 28, the quantum task manager 30, and/or the quantum service scheduler 32 may be made accessible to other services, processes, and/or computing devices (e.g., via a defined application programming interface (API), as a non-limiting example).

The quantum service 26 is associated with a service definition file 34, which provides quantum programming instructions (captioned as "INSTR" in FIG. 1 and referred to herein as "instructions") 36(0)-36(S) that define the quantum service 26 and that configure and manipulate qubits (not shown) used by the quantum service 26. The service definition file 34 in some examples may comprise a QASM file. The qubits allocated to the quantum service 26 may be used to store data values, and/or may have quantum states (e.g., spin, as a non-limiting example) into which the qubits are programmatically placed.

The quantum computing device 18 also executes a quantum error correction service 38, which monitors the execution of quantum services such as the quantum service 26 for the occurrence of error conditions, including quantum errors arising from the inherent instability of qubits caused by factors such as susceptibility to interference from the operating environment of the quantum computing device 18, faulty preparation, faulty gates, and other issues. Upon detection of an error, the quantum error correction service 38 is configured to identify a location of the error within the corresponding service definition file (such as the service definition file 34) and identify a corrective action to remedy or mitigate the effects of the error. The corrective action may include, for example, reallocation of qubits, recalculation of data values, and/or resetting quantum states of qubits, as non-limiting examples.

As noted above, quantum services such as the quantum service 26 that execute for a long period of time and generate frequent quantum errors may incur increased performance penalties due to the consumption of quantum resources by quantum error correction services such as the quantum error correction service 38. Moreover, conventional quantum error correction services such as the quantum error correction service 38 do not provide any functionality for ensuring that a corrective action identified in response to an occurrence of an error is necessarily optimized for the environment in which the error occurred.

In this regard, the classical computing device 12 of FIG. 1 implements an error correction optimization service 40 for performing JIT error correction optimization for quantum services using quantum simulators. In exemplary operation, the error correction optimization service 40 receives an error correction optimization request 42 from the quantum computing device 18. The error correction optimization request 42 in some examples may be generated and transmitted by a corresponding error correction optimization service 40' executing on the quantum computing device 18 based on data generated in conventional fashion by the quantum error correction service 38 of the quantum computing device 18 in response to an occurrence of an error during execution of the quantum service 26 using the service definition file 34.

The error correction optimization request 42 comprises one or more instructions of the service definition file 34 of the quantum service 26 that include a location of the error within the service definition file 34. For instance, the one or more instructions may comprise an instruction that generated the error, along with all preceding instructions in the service definition file 34. In the example of FIG. 1, the error correction optimization request 42 includes the instruction 36(0), which for purposes of illustration is assumed to be the instruction that triggered the error. Accordingly, the instruction 36(0) is also referred to herein as the "one or more instructions 36(0) of the service definition file 34."

The error correction optimization request 42 also includes a corrective action 44, which indicates a remedial action (not shown) identified in conventional fashion by the quantum error correction service 38 to correct the error. The remedial action may comprise, e.g., reallocation of qubits, recalculation of data values, and/or resetting quantum states of qubits, as non-limiting examples. The corrective action 44 in some examples may also indicate a result (not shown) of performing the remedial action.

Upon receiving the error correction optimization request 42, the error correction optimization service 40 instantiates a plurality of quantum simulator instances (captioned as "SIM" in FIG. 1) 46(0)-46(Q). Each of the plurality of quantum simulator instances 46(0)-46(Q) may comprise an instance of the Qiskit quantum simulation framework, as a non-limiting example, and may be executed in parallel by the classical computing device 12. The quantum simulator instances 46(0)-46(Q) may each be configured to simulate quantum computing environments having different characteristics, such as different availability of quantum resources such as qubits, different operating environments, different tolerances for error, and the like. Accordingly, the quantum simulator instances 46(0)-46(Q) are associated with corresponding error correction profiles (captioned as "EC PROFILE" in FIG. 1) 48(0)-48(Q) that specify one or more characteristics of the quantum computing environment simulated by the respective quantum simulator instances 46(0)-46(Q). In some examples, the error correction profiles 48(0)-48(Q) each may comprise a number of available qubits, an indication of an operating environment characteristic (e.g., temperature, processor load, memory availability, noise level, and/or the like, as non-limiting errors), and/or an indication of an error sensitivity threshold.

The error correction optimization service 40 then initiates execution of the one or more instructions 36(0) of the service definition file 34 and the corrective action 44 in each of the plurality of quantum simulator instances 46(0)-46(Q). This may include, for instance, generating an executable service definition file (not shown) for each of the quantum simulator instances 46(0)-46(Q) based on the one or more instructions 36(0) and the corrective action 44. The error correction optimization service 40 may initiate execution of the one or more instructions 36(0) by, e.g., accessing functionality of the quantum simulator instances 46(0)-46(Q) using an API (not shown) of the quantum simulator instances 46(0)-46(Q). The quantum simulator instances 46(0)-46(Q) generate a corresponding plurality of execution results 50(0)-50(Q) that indicate, e.g., data values or quantum states of simulated qubits as a result of executing the one or more instructions 36(0) and the corrective action 44 under the simulated conditions specified by the error correction profiles 48(0)-48(Q).

Because the error correction profiles 48(0)-48(Q) may differ from each other, the execution results 50(0)-50(Q) generated by the quantum simulator instances 46(0)-46(Q) may also differ from each other and/or from results indicated by the corrective action 44 received by the error correction optimization service 40 as part of the error correction optimization request 42. The error correction optimization service 40 thus may use a result evaluation criterion 52 to identify an optimal execution result among the plurality of execution results 50(0)-50(Q). The result evaluation criterion 52 may specify, for example, an execution time criterion, a resource usage criterion, an accuracy criterion, a reliability criterion, a precision criterion, a reproducibility criterion, and/or the like, as non-limiting examples. Note that, in this context, the "optimal execution result" is the execution result among the plurality of execution results 50(0)-50(Q) that is determined to most satisfy the result evaluation criterion 52 in comparison to, e.g., a result indicated by the corrective action 44.

According to some examples, the error correction optimization service may identify the optimal execution result among the plurality of execution results 50(0)-50(Q) by comparing each of the plurality of execution results 50(0)-50(Q) with a result indicated by the corrective action 44 using the result evaluation criterion 52. Some examples may provide that a desired result is indicated by the one or more instructions 36(0) of the service definition file 34 (e.g., as a comment or other indication contained within the one or more instructions 36(0), as a non-limiting example). Thus, in such examples, the error correction optimization service 40 may identify the optimal execution result among the plurality of execution results 50(0)-50(Q) by comparing each of the plurality of execution results 50(0)-50(Q) with a desired result indicated by the one or more instructions 36(0) of the service definition file 34 using the result evaluation criterion 52. In the example of FIG. 1, assume that the execution result 50(0) is identified as the optimal execution result. Accordingly, the execution result 50(0) is also referenced herein as the "optimal execution result 50(0)." The error correction optimization service 40 then transmits the optimal execution result 50(0) to the quantum computing device 18 (i.e., to the error correction optimization service 40').

In some examples, the error correction optimization service 40' receives the optimal execution result 50(0) from the classical computing device 12. In some such examples, the error correction optimization service 40' may detect a subsequent execution of the quantum service 26 by the quantum computing device 18. This may be accomplished by, e.g., by communicating with the quantum task manager 30 and/or the quantum service scheduler 32 of the quantum computing device 18. The error correction optimization service 40' also detects that a last instruction of the one or more instructions 36(0) preceding the location of the error in the service definition file 34 has executed. In response to detecting that the last instruction of the one or more instructions 36(0) preceding the location of the error in the service definition file 34 file has executed, the error correction optimization service 40' implements the optimal execution result 50(0). This may comprise, for instance, configuring the quantum computing device 18 to directly manipulate data values or quantum states of qubits used by the quantum service 26 to produce in the optimal execution result 50(0) instead of executing the instruction that previously caused the error.

Some examples may provide that the error correction optimization service 40' may generate a revised service definition file 54 that is based on the service definition file 34 and incorporates the optimal execution result 50(0). The error correction optimization service 40' then configures the quantum computing device 18 to instantiate subsequent instances of the quantum service 26 using the revised service definition file 54. In some such examples, the error correction optimization service 40' may also detect that all executing instances of the quantum service 26 on the quantum computing device 18 have completed execution (e.g., by querying the quantum task manager 30 and/or the quantum service scheduler 32 of the quantum computing device 18). The error correction optimization service 40', in response, may then terminate the quantum service 26.

According to some examples, the error correction optimization service 40' may modify the service definition file 34 itself on the quantum computing device 18 to incorporate the optimal execution result 50(0) (i.e., modifying the service definition file 34 "on the fly" while instances of the quantum service 26 are executing). In such examples, the error correction optimization service 40' would coordinate with elements of the quantum computing device 18, such as the quantum task manager 30, the quantum service scheduler 32, and/or the qubit registry 28, to minimize the impact of modifying the service definition file 34 on the executing instances of the quantum service 26.

It is to be understood that, because the error correction optimization service 40 is a component of the classical computing device 12, functionality implemented by the error correction optimization service 40 may be attributed to the computing system 10 generally. Moreover, in examples where the error correction optimization service 40 comprises software instructions that program the processor device 16 to carry out functionality discussed herein, functionality implemented by the error correction optimization service 40 may be attributed herein to the processor device 16. It is to be further understood that while, for purposes of illustration only, the error correction optimization service 40 is depicted as a single component, the functionality implemented by the error correction optimization service 40 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
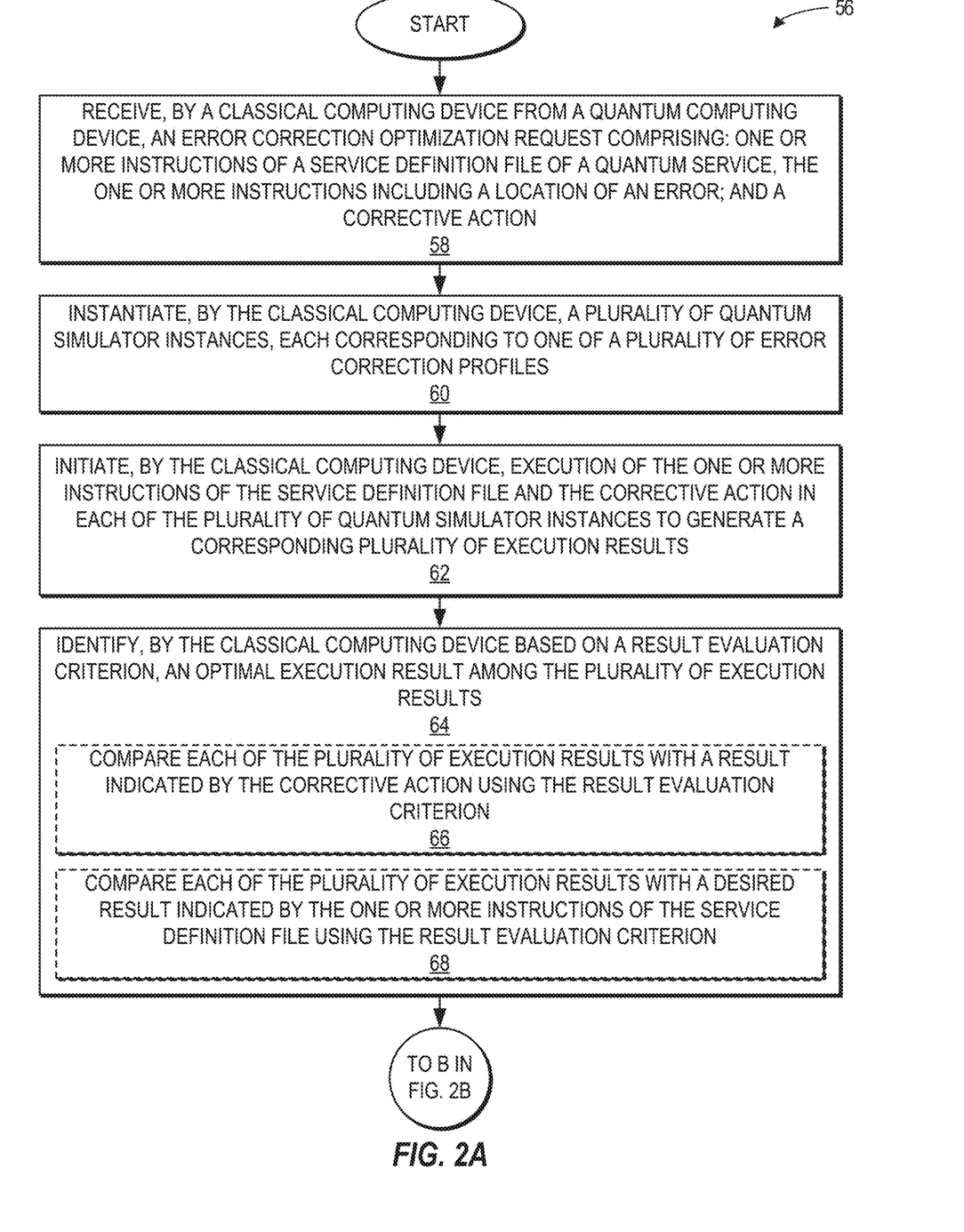
FIGS. 2A-2C are flowcharts illustrating operations performed by the computing system of FIG. 1 for performing Just-In-Time (JIT) error correction optimization for quantum services using quantum simulators, according to one example.
Figure 2B:
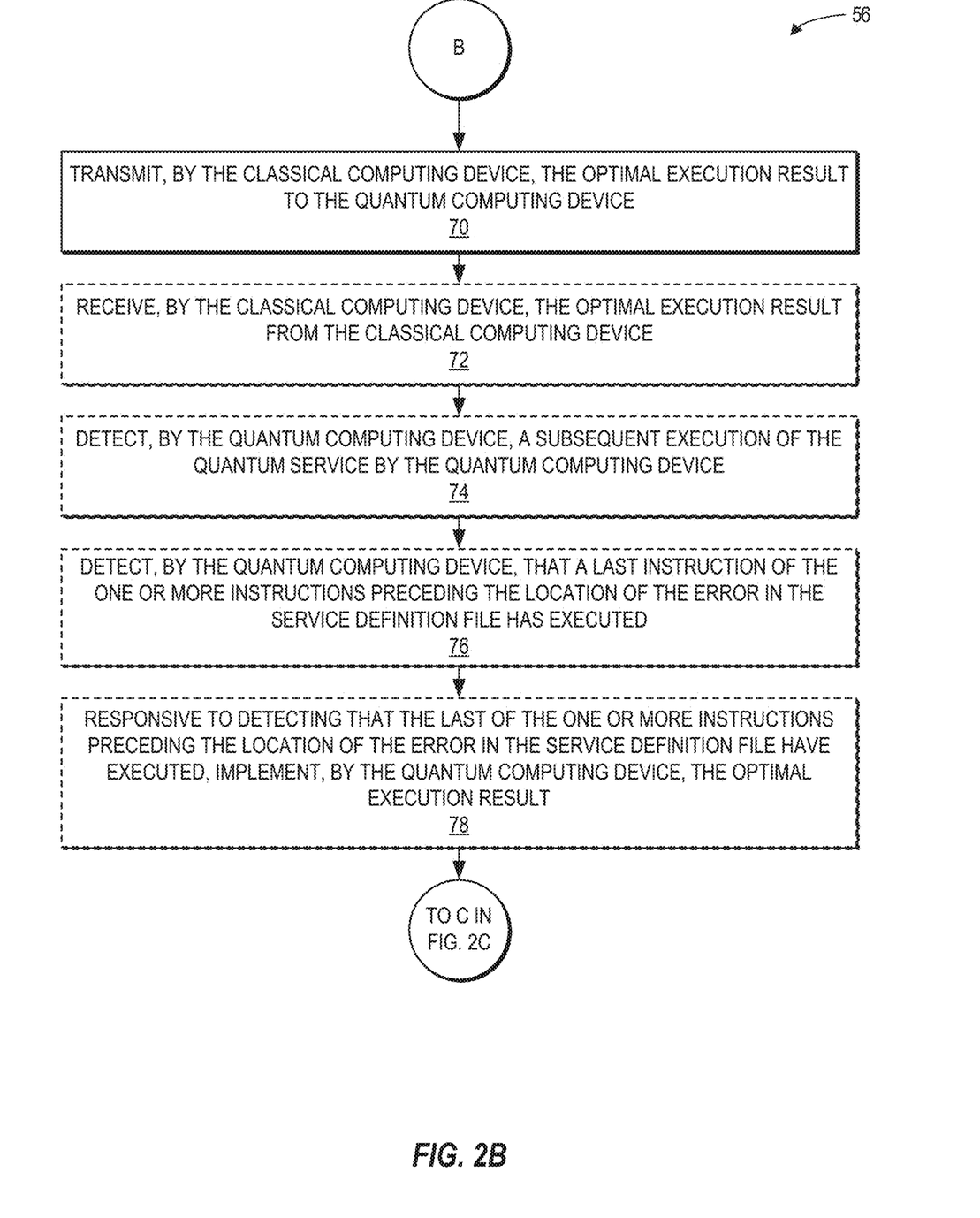
Figure 2C:
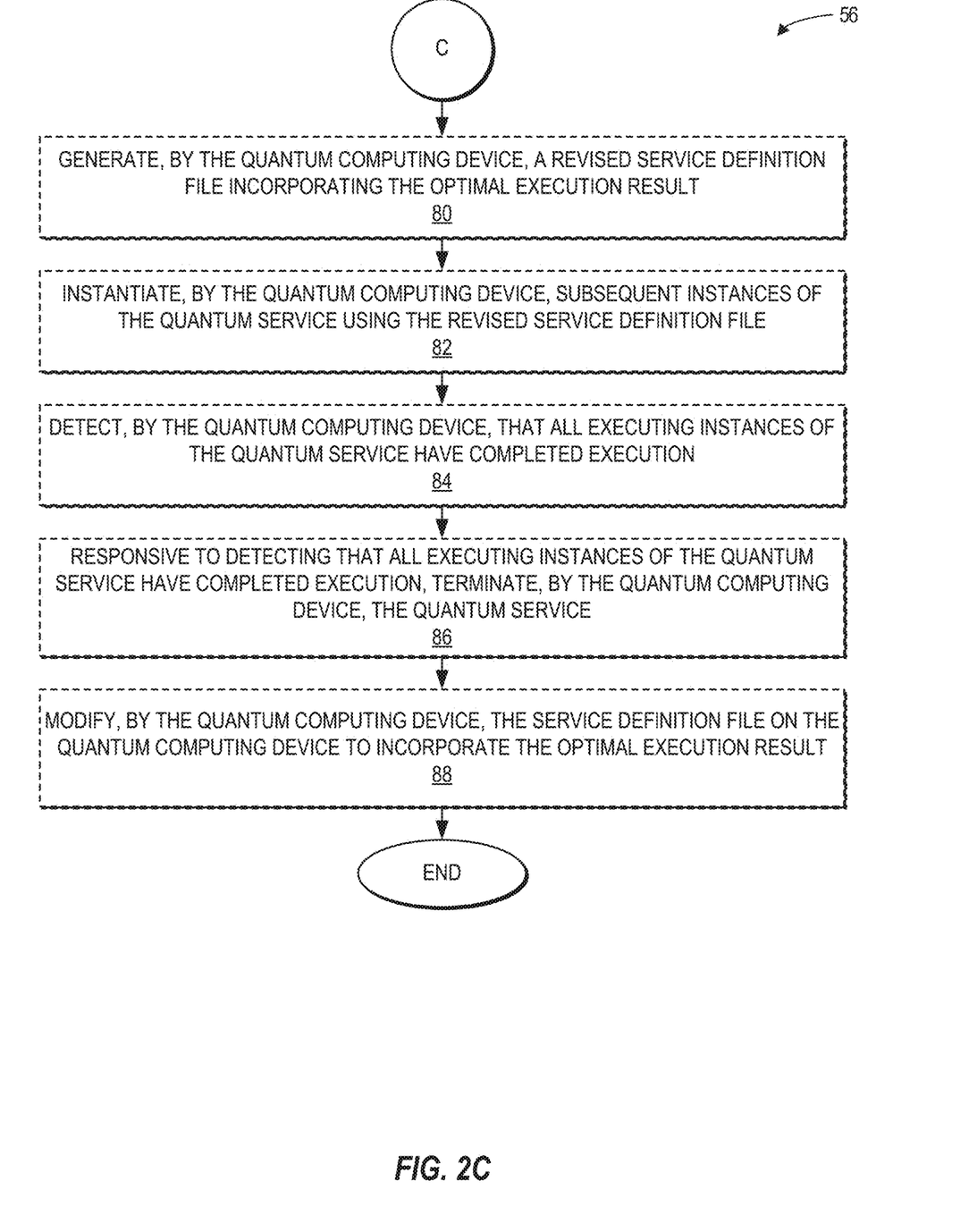

To illustrate exemplary operations performed by the computing system of FIG. 1 for performing JIT error correction optimization for quantum services using quantum simulators according to one example, FIGS. 2A-2C provide a flowchart 56. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted.

Operations in FIG. 2A begin with the processor device 16 of the classical computing device 12 of FIG. 1 (e.g., by executing the error correction optimization service 40 of FIG. 1) receiving, from a quantum computing device, such as the quantum computing device 18 of FIG. 1, an error correction optimization request (e.g., the error correction optimization request 42 of FIG. 1) comprising one or more instructions of a service definition file of a quantum service (e.g., the one or more instructions 36(0) of the service definition file 34 of the quantum service 26), the one or more instructions 36(0) including a location of an error, and a corrective action (e.g., the corrective action 44 of FIG. 1) (block 58). The error correction optimization service 40 instantiates a plurality of quantum simulator instances, such as the quantum simulator instances 46(0)-46(Q) of FIG. 1, each corresponding to one of a plurality of error correction profiles (e.g., the plurality of error correction profiles 48(0)-48(Q) of FIG. 1) (block 60). The error correction optimization service 40 next executes the one or more instructions 36(0) of the service definition file 34 and the corrective action 44 in each of the plurality of quantum simulator instances 46(0)-46(Q) to generate a corresponding plurality of execution results (e.g., the plurality of execution results 50(0)-50(Q) of FIG. 1) (block 62).

Based on a result evaluation criterion, such as the result evaluation criterion 52 of FIG. 1, the error correction optimization service 40 identifies an optimal execution result (e.g., the optimal execution result 50(0) of FIG. 1) among the plurality of execution results 50(0)-50(Q) (block 64). In some examples, the operations of block 64 for identifying the optimal execution result 50(0) may comprise comparing each of the plurality of execution results 50(0)-50(Q) with a result indicated by the corrective action 44 using the result evaluation criterion 52 (block 66). Some examples may provide that the operations of block 64 for identifying the optimal execution result 50(0) comprise comparing each of the plurality of execution results 50(0)-50(Q) with a desired result indicated by one or more instructions of the service definition file 34 using the result evaluation criterion 52 (block 68). Operations then continue at block 70 of FIG. 2B.

Turning now to FIG. 2B, the error correction optimization service 40 then transmits the optimal execution result 50(0) to the quantum computing device 18 (i.e., to the error correction optimization service 40') (block 70). In some examples, the error correction optimization service 40' receives the optimal execution result 50(0) from the classical computing device 12 (block 72). The error correction optimization service 40' in some such examples may detect a subsequent execution of the quantum service 26 by the quantum computing device 18 (block 74). The error correction optimization service 40' may further detect that a last instruction of the one or more instructions 36(0) preceding the location of the error in the service definition file 34 has executed (block 76). Responsive to detecting that the last instruction of the one or more instructions 36(0) preceding the location of the error in the service definition file 34 has executed, the error correction optimization service 40' implements the optimal execution result 50(0) (e.g., by configuring the quantum computing device 18 to manipulate data values or quantum states of qubits used by the quantum service 26 instead of executing the instruction that caused the error, as a non-limiting example) (block 78). Operations in some examples may continue at block 80 of FIG. 2C.

Referring now to FIG. 2C, in some examples, the error correction optimization service 40' generates a revised service definition file (e.g., the revised service definition file 54 of FIG. 1) incorporating the optimal execution result 50(0) (block 80). The error correction optimization service 40' then configures the quantum computing device 18 to instantiate subsequent instances of the quantum service 26 using the revised service definition file 54 (block 82). Some examples may further provide that the error correction optimization service 40' may detect that all executing instances of the quantum service 26 have completed execution (block 84). Responsive to detecting that all executing instances of the quantum service 26 on the quantum computing device 18 have completed execution, the error correction optimization service 40' may terminate the quantum service 26 (block 86). According to some examples, the error correction optimization service 40' may modify the service definition file 34 on the quantum computing device 18 to incorporate the optimal execution result 50(0) (i.e., while instances of the quantum service 26 are executing on the quantum computing device 18) (block 88).

Figure 3:
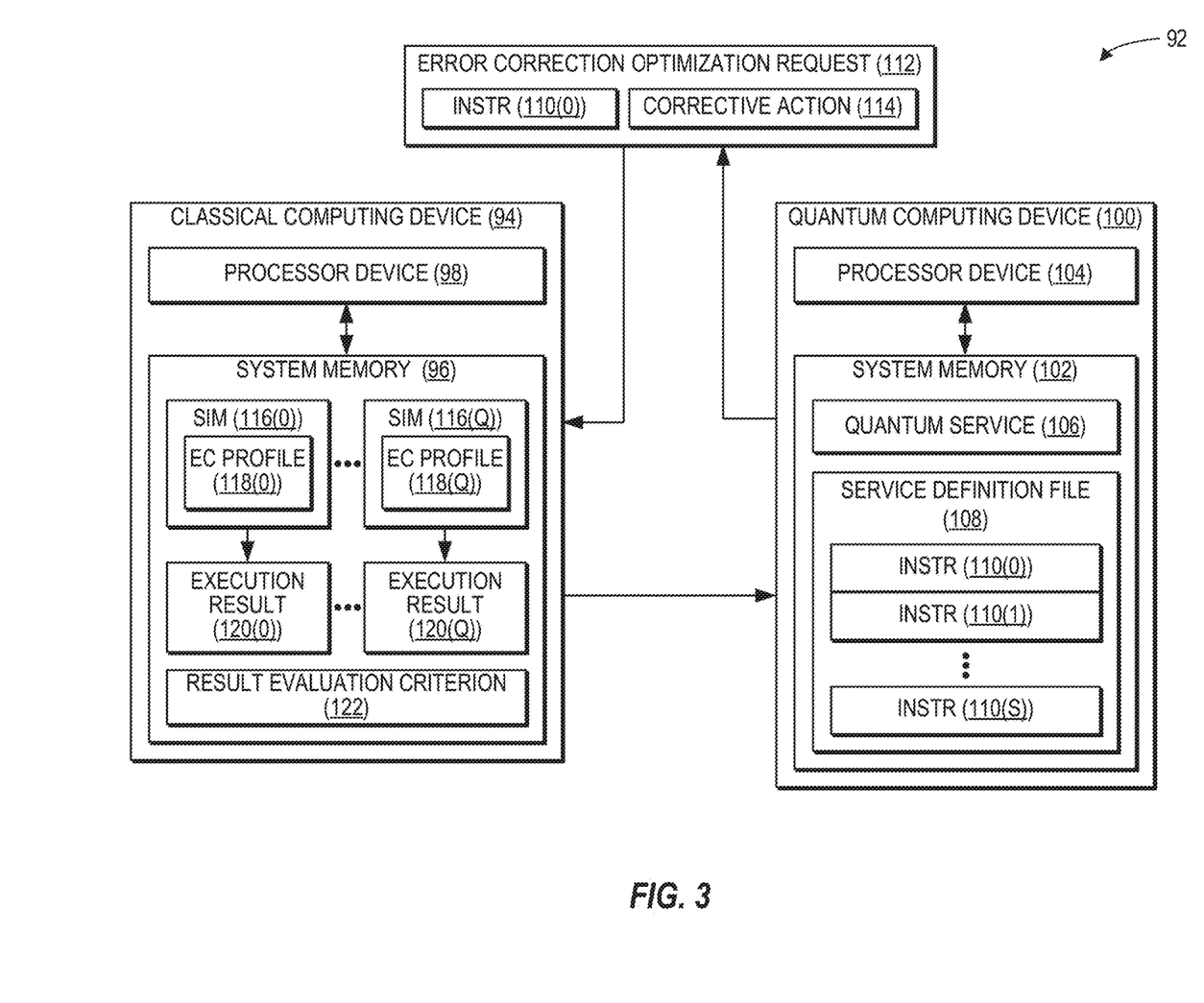
FIG. 3 is a simpler block diagram of the computing system of FIG. 1 for performing JIT error correction optimization for quantum services using quantum simulators, according to one example.

FIG. 3 is a simpler block diagram of the computing system 10 of FIG. 1 for performing JIT error correction optimization for quantum services using quantum simulators, according to one example. In the example of FIG. 3, a computing system 92 includes a classical computing device 94 that comprises a system memory 96 and a processor device 98, and further includes a quantum computing device 100 that comprises a system memory 102 and a processor device 104. The quantum computing device 100 executes a quantum service 106, which comprises a process that employs one or more qubits (not shown) to perform quantum operations. The quantum service 106 is associated with a service definition file 108, which provides quantum programming instructions (captioned as "INSTR" in FIG. 3, and referred to herein as "instructions") 110(0)-110(S) that define the quantum service 106 and that configure and manipulate qubits (not shown) used by the quantum service 106.

In exemplary operation, the processor device 98 receives an error correction optimization request 112 from the quantum computing device 100. The error correction optimization request 112 comprises one or more instructions (e.g., the instruction 110(0) of FIG. 3) of the service definition file 108 of the quantum service 106 that include a location of the error within the service definition file 108, and also includes a corrective action 114. Upon receiving the error correction optimization request 112, the processor device 98 instantiates a plurality of quantum simulator instances (captioned as "SIM" in FIG. 3) 116(0)-116(Q). The quantum simulator instances 116(0)-116(Q) are associated with corresponding error correction profiles (captioned as "EC PROFILE" in FIG. 3) 118(0)-118(Q) that specify one or more characteristics of the quantum computing environment simulated by the respective quantum simulator instances 116(0)-116(Q).

The processor device 98 then initiates execution of the one or more instructions 110(0) of the service definition file 108 and the corrective action 114 in each of the plurality of quantum simulator instances 116(0)-116(Q). The quantum simulator instances 116(0)-116(Q) generate a corresponding plurality of execution results 120(0)-120(Q) that indicate, e.g., data values or quantum states of simulated qubits as a result of executing the one or more instructions 110(0) under the simulated conditions specified by the error correction profiles 118(0)-118(Q). The processor device 98 uses a result evaluation criterion 122 to identify an optimal execution result (e.g., the execution result 120(0) of FIG. 3) among the plurality of execution results 120(0)-120(Q). The processor device 98 then transmits the optimal execution result 120(0) to the quantum computing device 100.

Figure 4:
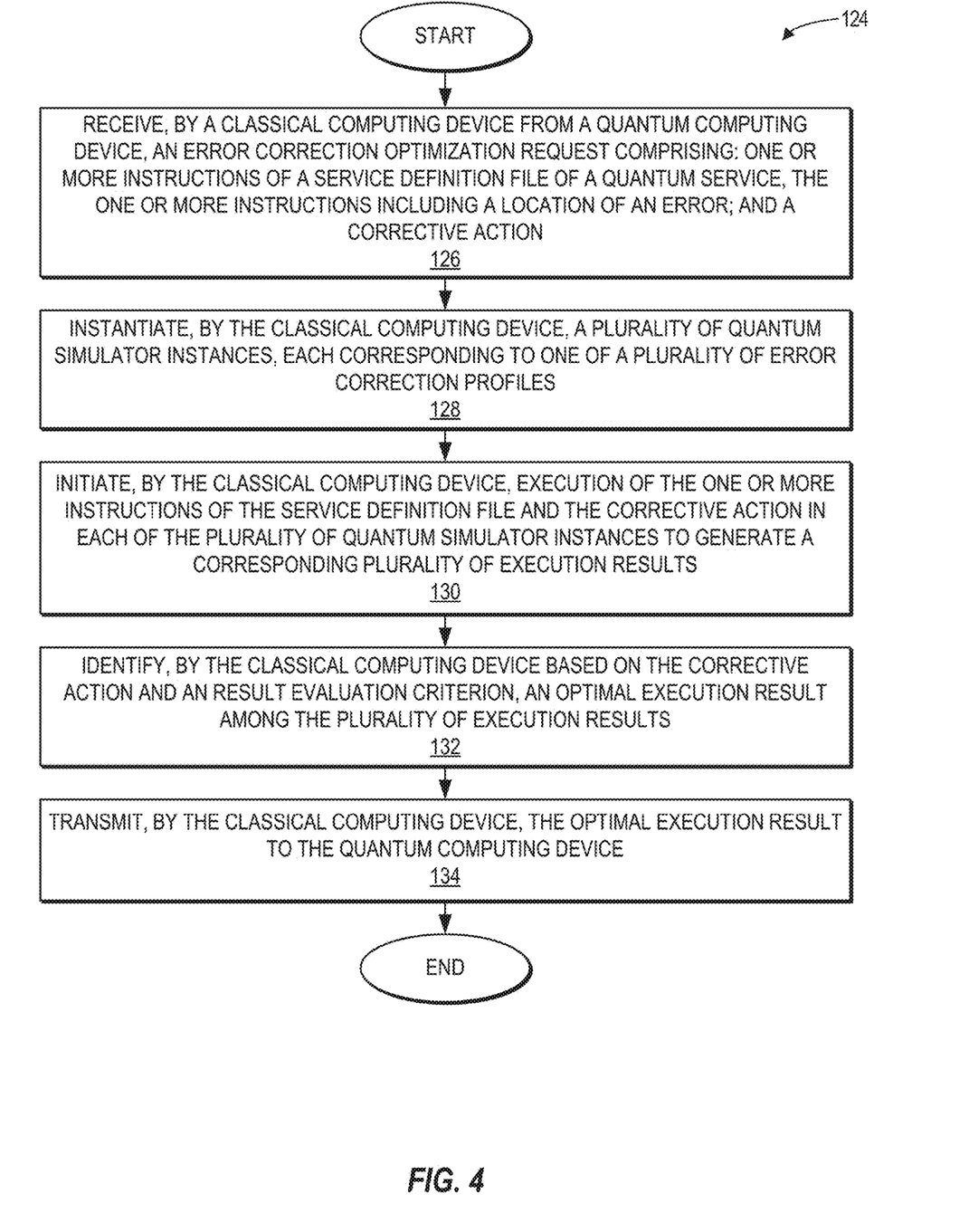
FIG. 4 is a flowchart of a simplified method for performing JIT error correction optimization for quantum services using quantum simulators by the quantum computing device of FIG. 3, according to one example.

FIG. 4 provides a flowchart 124 to illustrate a simplified method for performing JIT error correction optimization for quantum services using quantum simulators by the classical computing device 94 of FIG. 3 according to one example. Elements of FIG. 3 are referenced in describing FIG. 4 for the sake of clarity. In FIG. 4, operations begin with the processor device 98 of the classical computing device 94 receiving, from the quantum computing device 100, the error correction optimization request 112 comprising one or more instructions 110(0) of the service definition file 108 of the quantum service 106, the one or more instructions 110(0) including a location of an error, and the corrective action 114 (block 126). The processor device 98 instantiates the plurality of quantum simulator instances 116(0)-116(Q), each corresponding to one of the plurality of error correction profiles 118(0)-118(Q) (block 128).

The processor device 98 next initiates execution of the one or more instructions 110(0) of the service definition file 108 and the corrective action 114 in each of the plurality of quantum simulator instances 116(0)-116(Q) to generate the corresponding plurality of execution results 120(0)-120(Q) (block 130). The processor device 98 identifies, based on the corrective action 114 and the result evaluation criterion 122, the optimal execution result 120(0) among the plurality of execution results 120(0)-120(Q) (block 132). The processor device 98 then transmits the optimal execution result 120(0) to the quantum computing device 100 (block 134).

Figure 5:
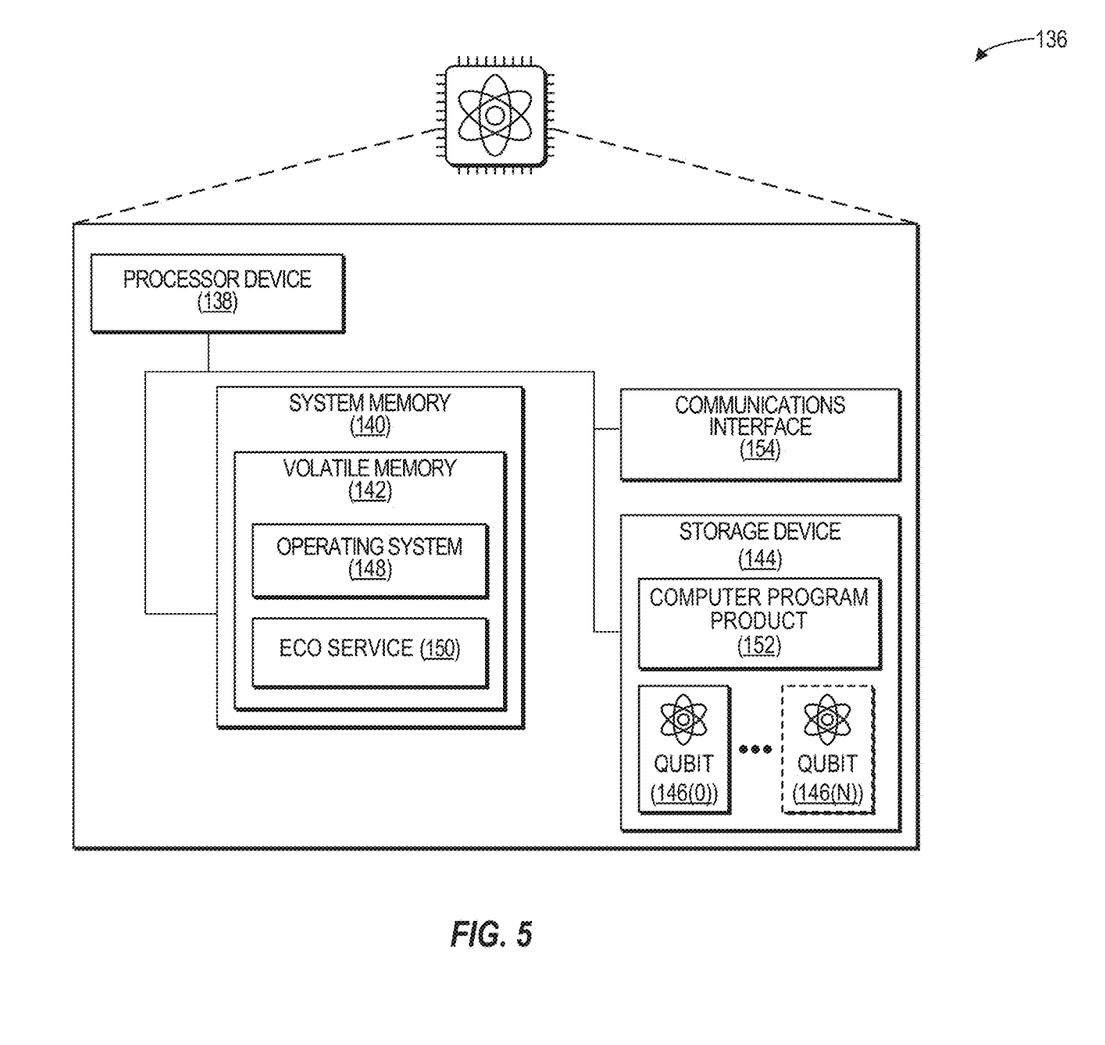
FIG. 5 is a block diagram of a quantum computing device suitable for implementing examples, according to one example.

FIG. 5 is a block diagram of a quantum computing device 136, such as the classical computing device 12 of FIG. 1, in some examples, and the quantum computing device 18 of FIG. 1, suitable for implementing examples according to one example. The quantum computing device 136 may comprise any suitable quantum computing device or devices. The quantum computing device 136 can operate using classical computing principles or quantum computing principles. When using quantum computing principles, the quantum computing device 136 performs computations that utilize quantum-mechanical phenomena, such as superposition and entanglement. The quantum computing device 136 may operate under certain environmental conditions, such as at or near zero degrees (0°) Kelvin. When using classical computing principles, the quantum computing device 136 utilizes binary digits that have a value of either zero (0) or one (1).

The quantum computing device 136 includes a processor device 138 and a system memory 140. The processor device 138 can be any commercially available or proprietary processor suitable for operating in a quantum environment. The system memory 140 may include volatile memory 142 (e.g., random-access memory (RAM)). The quantum computing device 136 may further include or be coupled to a non-transitory computer-readable medium such as a storage device 144. The storage device 144 and other drives associated with computer-readable media and computer-usable media may provide non-volatile storage of data, data structures, computer-executable instructions, and the like. The storage device may also provide functionality for storing one or more qubits 146(0)-146(N).

A number of modules can be stored in the storage device 144 and in the volatile memory 142, including an operating system 148 and one or more modules, such as an error correction optimization service (captioned as "ECO SERVICE" in FIG. 5) 150. All or a portion of the examples may be implemented as a computer program product 152 stored on a transitory or non-transitory computer-usable or computer-readable medium, such as the storage device 144, which includes complex programming instructions, such as complex computer-readable program code, to cause the processor device 138 to carry out the steps described herein. Thus, the computer-readable program code can comprise computer-executable instructions for implementing the functionality of the examples described herein when executed on the processor device 138.

An operator may also be able to enter one or more configuration commands through a keyboard (not illustrated), a pointing device such as a mouse (not illustrated), or a touch-sensitive surface such as a display device (not illustrated). The quantum computing device 136 may also include a communications interface 154 suitable for communicating with other quantum computing systems, including, in some implementations, classical computing devices.

Figure 6:
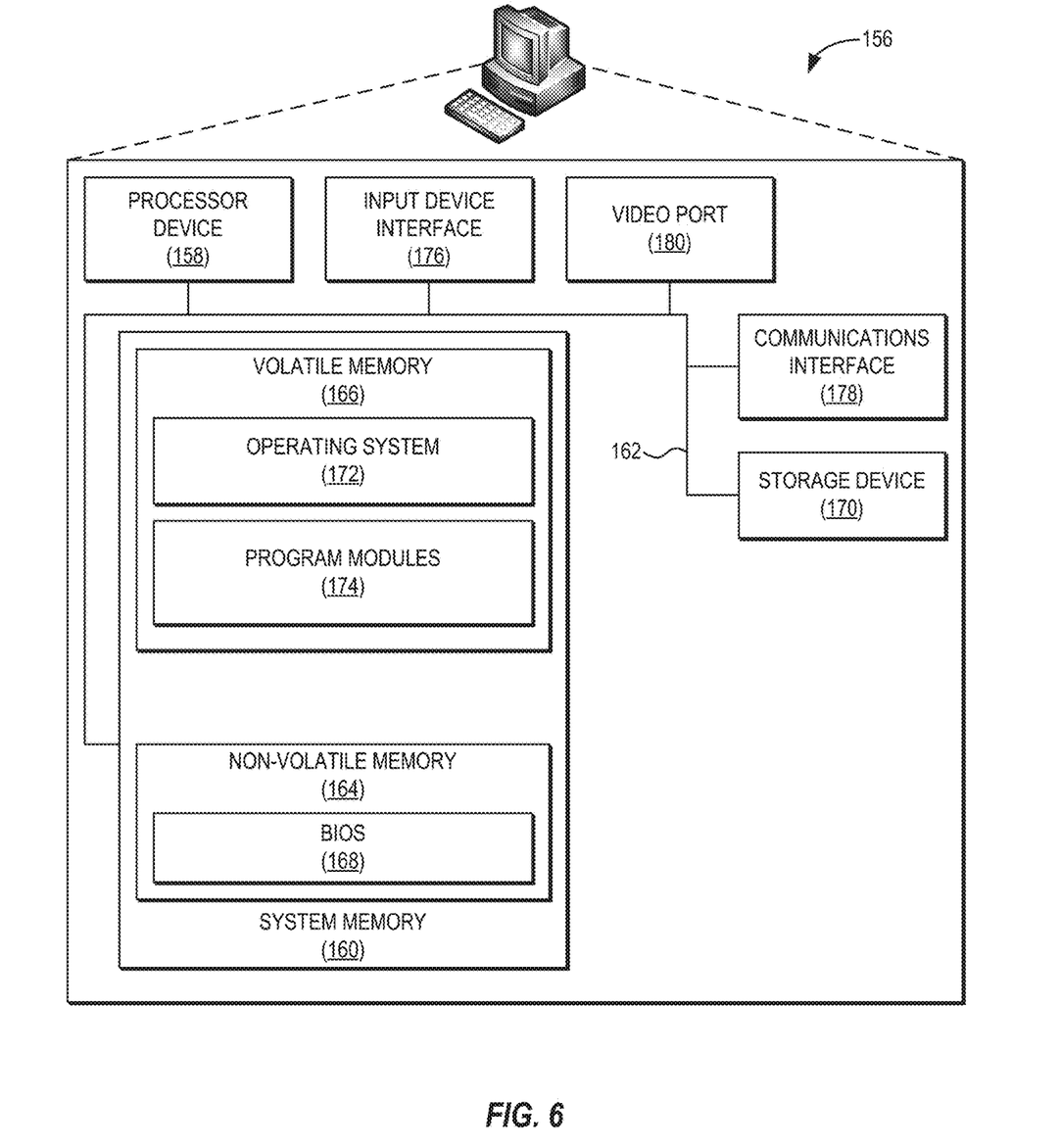
FIG. 6 is a block diagram of a classical computing device suitable for implementing examples, according to one example.

FIG. 6 is a block diagram of a processor-based computing device 156 ("computing device 156" or "classical computing device 156"), such as the classical computing device 12 of FIG. 1 in some examples, suitable for implementing examples according to one example. The computing device 156 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 156 includes a processor device 158, a system memory 160, and a system bus 162. The system bus 162 provides an interface for system components including, but not limited to, the system memory 160 and the processor device 158. The processor device 158 can be any commercially available or proprietary processor.

The system bus 162 may be any of several types of bus structures that may further interconnect to a memory bus (with or without a memory controller), a peripheral bus, and/or a local bus using any of a variety of commercially available bus architectures. The system memory 160 may include non-volatile memory 164 (e.g., read-only memory (ROM), erasable programmable ROM (EPROM), electrically EPROM (EEPROM), etc.), and volatile memory 166 (e.g., RAM). A basic input/output system (BIOS) 168 may be stored in the non-volatile memory 164 and can include the basic routines that help to transfer information among elements within the computing device 156. The volatile memory 166 may also include a high-speed RAM, such as static RAM, for caching data.

The computing device 156 may further include or be coupled to a non-transitory computer-readable storage medium such as a storage device 170, which may comprise, for example, an internal or external hard disk drive (HDD) (e.g., enhanced integrated drive electronics (EIDE) or serial advanced technology attachment (SATA)), for storage, flash memory, or the like. The storage device 170 and other drives associated with computer-readable media and computer-usable media may provide non-volatile storage of data, data structures, computer-executable instructions, and the like.

Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 170 and in the volatile memory 166, including an operating system 172 and one or more program modules 174 which may implement the functionality described herein in whole or in part. It is to be appreciated that the examples can be implemented with various commercially available operating systems 172 or combinations of operating systems 172. All or a portion of the examples may be implemented as a computer program product stored on a transitory or non-transitory computer-usable or computer-readable storage medium, such as the storage device 170, which includes complex programming instructions, such as complex computer-readable program code, to cause the processor device 158 to carry out the steps described herein. Thus, the computer-readable program code can comprise software instructions for implementing the functionality of the examples described herein when executed on the processor device 158. The processor device 158 may serve as a controller, or control system, for the computing device 156 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 158 through an input device interface 176 that is coupled to the system bus 162 but can be connected by other interfaces, such as a parallel port, an Institute of Electrical and Electronic Engineers (IEEE) 1394 serial port, a Universal Serial Bus (USB) port, an IR interface, and the like.

The computing device 156 may also include a communications interface 178 suitable for communicating with a network as appropriate or desired. The computing device 156 may also include a video port 180 to interface with a display device to provide information to a user.

Individuals will recognize improvements and modifications to the preferred examples of the disclosure. All such improvements and modifications are considered within the scope of the concepts disclosed herein and the claims that follow.

What is claimed is:
1. A method, comprising:
receiving, by a classical computing device from a quantum computing device, an error correction optimization request comprising:
one or more instructions of a service definition file of a quantum service, the one or more instructions including a location of an error; and
a corrective action;
instantiating, by the classical computing device, a plurality of quantum simulator instances, each quantum simulator instance simulating a quantum computing environment corresponding to one of a plurality of error correction profiles;
executing, by the classical computing device, the one or more instructions of the service definition file and the corrective action in each of the plurality of quantum simulator instances to generate a corresponding plurality of execution results;

identifying, by the classical computing device based on a measurable element of the plurality of execution results, an execution result among the plurality of execution results resulting from executing the one or more instructions of the service definition file and the corrective action in each of the plurality of quantum simulator instances; and transmitting, by the classical computing device, the execution result to the quantum computing device.

2. The method of claim 1, wherein each error correction profile of the plurality of error correction profiles comprises one or more of a number of available qubits, an indication of an operating environment characteristic, and an indication of an error sensitivity threshold.

3. The method of claim 1, wherein identifying the optimal execution result comprises comparing each of the plurality of execution results with a result indicated by the corrective action using the measurable element of the plurality of execution results.

4. The method of claim 1, wherein identifying the execution result comprises comparing each of the plurality of execution results with a desired result indicated by the one or more instructions of the service definition file using the measurable element of the plurality of execution results.

5. The method of claim 1, further comprising receiving, by the quantum computing device, the execution result.

6. The method of claim 5, further comprising:
detecting, by the quantum computing device, a subsequent the quantum service by the quantum computing device;
detecting, by the quantum computing device, that a last instruction of the one or more instructions preceding the location of the error in the service definition file has executed; and
responsive to detecting that a last instruction of the one or more instructions preceding the location of the error in the service definition file has executed, implementing, by the quantum computing device, the execution result.

7. The method of claim 6, wherein implementing the execution result comprises:
generating, by the quantum computing device, a revised service definition file incorporating the execution result; and
instantiating, by the quantum computing device, subsequent instances of the quantum service using the revised service definition file.

8. The method of claim 7, further comprising:
detecting, by the quantum computing device, that all executing instances of the quantum service have completed execution; and
responsive to detecting that all executing instances of the quantum service on the quantum computing device have completed execution, terminating, by the quantum computing device, the quantum service.

9. The method of claim 5, further comprising modifying, by the quantum computing device, the service definition file to incorporate the execution result.

10. A computing system comprising a classical computing device, comprising:
a first system memory; and
a first processor device communicatively coupled to the first system memory, the first processor device to:
receive, from a quantum computing device, an error correction optimization request comprising:
one or more instructions of a service definition file of a quantum service, the one or more instructions including a location of an error; and
a corrective action;
instantiate a plurality of quantum simulator instances, each quantum simulator instance simulating a quantum computing environment corresponding to one of a plurality of error correction profiles;
execute the one or more instructions of the service definition file and the corrective action in each of the plurality of quantum simulator instances to generate a corresponding plurality of execution results;
identify, based on a measurable element of the plurality of execution results, an execution result from among the plurality of execution results resulting from executing the one or more instructions of the service definition file and the corrective action in each of the plurality of quantum simulator instances; and
transmit the execution result to the quantum computing device.

11. The computing system of claim 10, wherein each error correction profile of the plurality of error correction profiles comprises one or more of a number of available qubits, an indication of an operating environment characteristic, and an indication of an error sensitivity threshold.

12. The computing system of claim 10, wherein to identify the execution result is to compare each of the plurality of execution results with a result indicated by the corrective action using the measurable element of the plurality of execution results.

13. The computing system of claim 10, wherein to identify the optimal execution result is to compare each of the plurality of execution results with a desired result indicated by the one or more instructions of the service definition file using the measurable element of the plurality of execution results.

14. The computing system of claim 10, further comprising the quantum computing device, comprising:
a second system memory; and
a second processor device communicatively coupled to the second system memory, the second processor device to receive the execution result.

15. The computing system of claim 14, wherein the second processor device is further to:
detect a subsequent the quantum service;
detect that a last instruction of the one or more instructions preceding the location of the error in the service definition file has executed; and
responsive to detecting that a last instruction of the one or more instructions preceding the location of the error in the service definition file has executed, implement the execution result.

16. The computing system of claim 14, wherein the second processor device is further to:
generate a revised service definition file incorporating the execution result; and
instantiate subsequent instances of the quantum service using the revised service definition file.

17. The computing system of claim 14, wherein the second processor device is further to:
detect that all executing instances of the quantum service have completed execution; and
responsive to detecting that all executing instances of the quantum service on the quantum computing device have completed execution, terminate the quantum service.

18. The computing system of claim 14, wherein the second processor device is further to modify the service definition file to incorporate the execution result.

19. A non-transitory computer-readable medium having stored thereon computer-executable instructions that, when executed, cause one or more processor devices to:
- receive, from a quantum computing device, an error correction optimization request comprising:
  - one or more instructions of a service definition file of a quantum service, the one or more instructions including a location of an error; and
  - a corrective action;
- instantiate a plurality of quantum simulator instances, each quantum simulator instance simulating a quantum computing environment corresponding to one of a plurality of error correction profiles;
- execute the one or more instructions of the service definition file and the corrective action in each of the plurality of quantum simulator instances to generate a corresponding plurality of execution results;
- identify, based on a measurable element of the plurality of execution results, an execution result from among the plurality of execution results resulting from executing the one or more instructions of the service definition file and the corrective action in each of the plurality of quantum simulator instances; and
- transmit the execution result to the quantum computing device.

20. The non-transitory computer-readable medium of claim 19, wherein each error correction profile of the plurality of error correction profiles comprises one or more of a number of available qubits, an indication of an operating environment characteristic, and an indication of an error sensitivity threshold.

* * * * *